(12) United States Patent
Bosmann et al.

(10) Patent No.: US 10,975,948 B2
(45) Date of Patent: Apr. 13, 2021

(54) SPROCKET

(71) Applicant: Röchling Industrial Xanten GmbH, Xanten (DE)

(72) Inventors: Karl-Heinz Bosmann, Xanten (DE); Jacob Willem Meijer, Wierden (NL)

(73) Assignee: Röchling Industrial Xanten GmbH, Xanten (DE)

( * ) Notice: Subject to any disclaimer, the term of this patent is extended or adjusted under 35 U.S.C. 154(b) by 0 days.

(21) Appl. No.: 16/539,336

(22) Filed: Aug. 13, 2019

(65) Prior Publication Data

US 2020/0056691 A1 Feb. 20, 2020

(30) Foreign Application Priority Data

Aug. 14, 2018 (DE) .................. 10 2018 119 690.3

(51) Int. Cl.
*F16H 55/12* (2006.01)
*B65G 23/06* (2006.01)
*F16H 55/30* (2006.01)

(52) U.S. Cl.
CPC ............. *F16H 55/12* (2013.01); *B65G 23/06* (2013.01); *F16H 55/30* (2013.01)

(58) Field of Classification Search
CPC .......... F16H 55/12; F16H 55/30; F16H 55/46; B25G 23/06
See application file for complete search history.

(56) References Cited

U.S. PATENT DOCUMENTS

| | | | | |
|---|---|---|---|---|
| 1,540,096 A | * | 6/1925 | William | F16H 55/12 74/450 |
| 3,501,972 A | * | 3/1970 | Morrow | F16H 55/30 474/95 |
| 4,043,214 A | * | 8/1977 | Westlake | F16H 55/12 474/162 |
| 4,631,974 A | * | 12/1986 | Wiegand | F16H 55/06 474/152 |
| 5,000,640 A | * | 3/1991 | Haas, Jr. | F16B 23/0061 411/409 |
| 5,295,917 A | * | 3/1994 | Hannum | F16H 55/12 474/95 |
| 5,833,562 A | * | 11/1998 | Walker, Sr. | F16H 55/30 474/96 |
| 6,074,316 A | * | 6/2000 | Murrietta, Sr. | F16H 55/12 474/95 |
| 6,125,713 A | * | 10/2000 | Langlois | B23P 6/00 29/402.01 |
| 9,388,894 B2 | * | 7/2016 | Van Der Ende | F16H 55/30 |

* cited by examiner

*Primary Examiner* — Jake Cook

(57) ABSTRACT

A sprocket is provided for arrangement on a drive shaft, the sprocket having a gear rim which has an externally toothed gear ring and a ring carrier, and a sleeve body, wherein the ring carrier has a recess for receiving the sleeve body and the sleeve body has a recess for receiving the drive shaft so that the gear rim can be arranged on the drive shaft with the sleeve body interposed there between, wherein the sleeve body is provided with a thread on its outer lateral surface and wherein the recess of the ring carrier provided for receiving the sleeve body has on the inner side thereof facing the sleeve body a thread corresponding to the thread of the sleeve body.

8 Claims, 7 Drawing Sheets

SPROCKET

CROSS-REFERENCE TO RELATED APPLICATIONS

Figure 1:
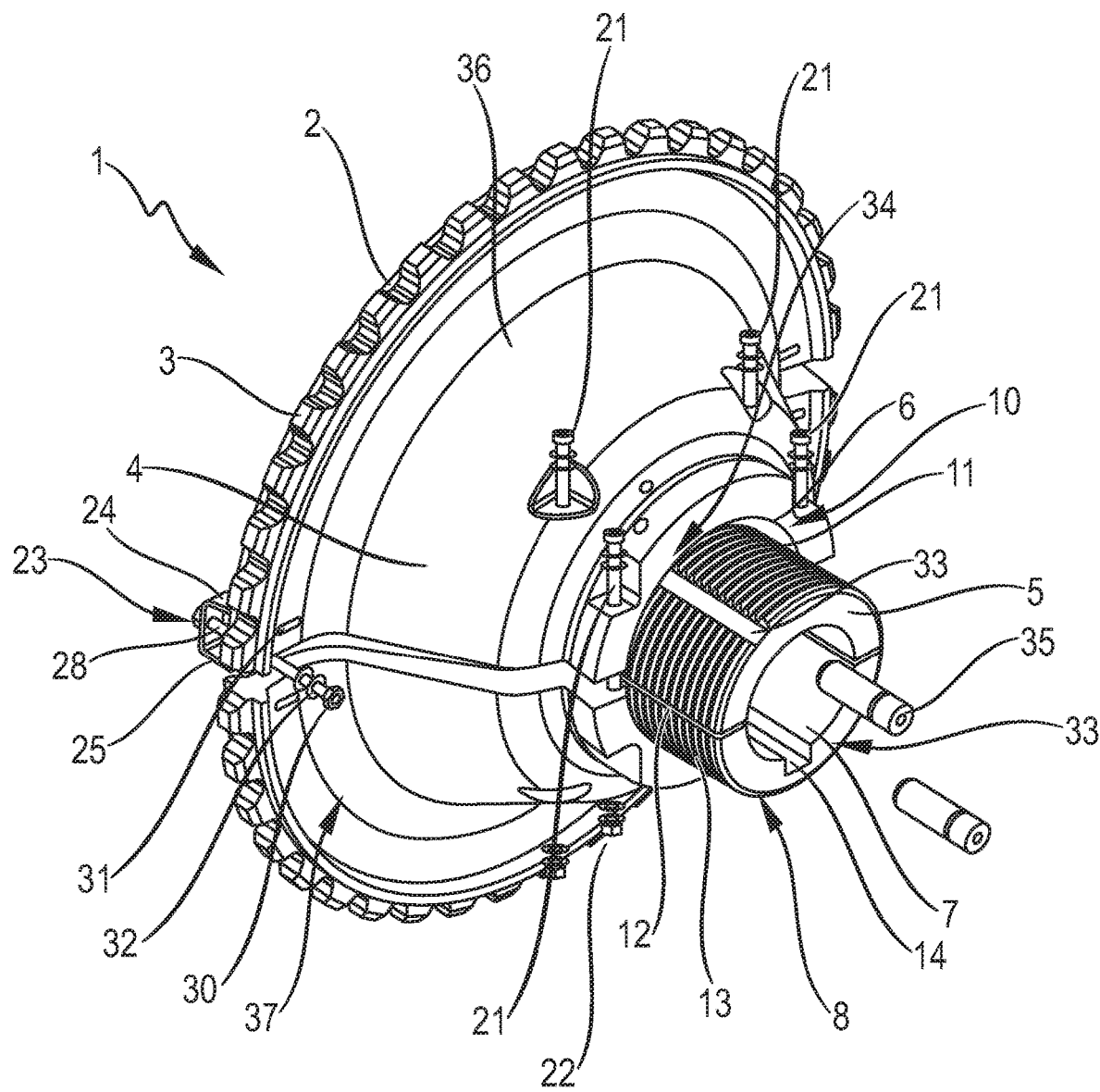

This application claims the benefit and priority of German Patent Application No. 10 2018 119 690.3, filed on Aug. 14, 2018. The entire disclosure of the above application is incorporated herein by reference.

FIELD

The disclosure relates to a sprocket for arrangement on a drive shaft.

BACKGROUND

Sprockets are well known in prior art. For this reason, printed proof is not necessary at this point.

A sprocket has a toothing on the outer end face which when used as intended is in engagement with a chain. The sprocket is typically arranged on a drive shaft so that a rotating movement of the drive shaft leads to a displacement movement of the chain guided over the sprocket under the effect of tensile force.

SUMMARY

It is an object of the disclosure to provide a sprocket that can be easily mounted and also easily demounted in the case of repairs, preferably without having to carry out any assembly and/or disassembly work on the drive shaft carrying the sprocket.

To achieve this object, the disclosure proposes a sprocket for arrangement on a shaft, preferably a drive shaft or an output shaft, the sprocket having a gear rim having an externally toothed gear ring and a ring carrier, and having a sleeve body, wherein the ring carrier has a recess for receiving the sleeve body and the sleeve body has a recess for receiving the shaft so that the gear rim can be arranged on the shaft with the sleeve body interposed there between, wherein the sleeve body is provided with a thread on its outer lateral surface and wherein the recess of the ring carrier provided for receiving the sleeve body has on its inner side facing the sleeve body a thread corresponding to the thread of the sleeve body.

The sprocket according to the disclosure has two main components, namely the gear rim on the one hand and the sleeve body on the other hand. In the final assembled state, the gear rim is arranged on the shaft, preferably the drive shaft or the output shaft, with the sleeve body interposed there between.

The gear rim provides a recess which receives the sleeve body in the final assembled state. The sleeve body is in turn provided with a recess through which the shaft, hereinafter also referred to as drive shaft, is guided in the final assembled state.

This two-part design has the advantage that, for the arrangement of the sprocket on a drive shaft, first the sleeve body and then the sprocket can be mounted. So at first, an arrangement of the sleeve body on the drive shaft takes place. As soon as the sleeve body is properly arranged on the drive shaft, the gear rim is mounted, namely on the sleeve body already positioned on the drive shaft.

According to the disclosure it is further provided that the sleeve body has a thread on its outer lateral surface. The gear rim carries a corresponding thread on the inside of the recess provided for receiving the sleeve body facing said sleeve body. In the final assembled state, these two threads mesh with each other.

As soon as the gear ring is mounted on the sleeve body with the corresponding threads meshing, a rotation movement of the gear ring in relation to the sleeve body and thus also in relation to the drive shaft is still possible in accordance with the thread design. This rotation option is used on the mounting or dismounting side to enable a fine adjustment to be made with regard to the positioning of the gear rim in the longitudinal extension of the drive shaft. The design according to the disclosure thus allows the gear rim to be rotated about the axis of rotation formed by the drive shaft, which causes the gear rim to rotate in relation to the sleeve body in a manner guided by the thread and, depending on the direction of rotation, to travel in the axial direction of the drive shaft in relation to the output shaft. As soon as the final alignment of the gear rim in the axial direction of the drive shaft is reached, the position of the gear rim is fixed with respect to the sleeve body so that the gear rim is secured with respect to the sleeve body also in the axial direction. According to this final assembled position, the gear rim is fixed relative to the sleeve body, thus creating a non-rotating connection to the drive shaft so that in the case of intended use a rotational movement introduced into the drive shaft can be transmitted to the gear rim with the sleeve body interposed there between.

The design according to the disclosure allows to assemble first the sleeve body and then the gear rim in an advantageous way, whereby the mutually engaging threads of the gear rim on the one hand and the sleeve body on the other hand offer the possibility of making a fine alignment of the gear rim in the axial direction of the drive shaft. As soon as the final position of the gear rim in relation to the drive shaft has been set, the position of the gear rim is fixed and secured in relation to the sleeve body, thus ensuring that the sprocket is not rotated on the drive shaft.

In this context, it is also advantageous that the distance between the end-face toothing of the gear rim on the one hand and the front and/or rear body edge of the sleeve body on the other hand in the longitudinal direction of the shaft can be individually and thus variably set depending on the installation situation. Thus the design according to the disclosure allows to span a plurality of possible distances and, different from prior art, it is not necessary to hold a plurality of individual components in supply for this purpose. According to the disclosure, the two main components constituting the sprocket, namely the gear rim on the one hand and the sleeve body on the other hand, are provided which based on the design of the disclosure allow a selective orientation or alignment and an adaption to the installation conditions given in each individual case.

The gear rim comprises an externally toothed gear ring and a ring carrier. The gear ring and the ring carrier can be manufactured as discrete components separately from each other and can then be connected to each other. Alternatively, a one-piece design of gear ring and ring carrier is also possible.

Depending on the desired design of the sprocket, the ring gear carrier can be formed as a disc, in the manner of a pot or in the form of spokes and/or the like. What is essential to the disclosure is that the sprocket has a gear rim on the one hand and a sleeve body on the other hand, said gear rim and said sleeve body being operatively connected to each other via corresponding threads, whereby it is possible to select and set a positioning of the gear rim in the axial direction of the drive shaft by a rotational movement of the gear rim relative to the sleeve body in the case of assembly or disassembly in the manner already described above.

Preferably, the sleeve body is of two-part design and comprises two half-shells corresponding to each other. In the final assembled state, these two combined half-shells constitute the sleeve body according to the disclosure.

This design has the advantage that the sleeve body can be arranged on the drive shaft without any prior assembly or disassembly of the drive shaft. This is particularly advantageous in the case of repairs. Because in such cases the drive shaft can remain in its unchanged position. It is then possible to assemble the sleeve body to the drive shaft by simply attaching the half-shells forming the sleeve body to the drive shaft and then joining the two halves together.

To arrange the sleeve body on the drive shaft in a non-rotating manner, one of the two half-shells has a longitudinally extending groove for receiving a feather key on the drive shaft side. In the final assembled state, this feather key is located inside the groove of the half-shell so that an arrangement of the sleeve body secured against rotation relative to the drive shaft is given after joining the two half-shells forming the sleeve body.

Moreover, the thread between the sleeve body and the gear rim is preferably chosen such that, in the final assembled state, the sleeve body is clamped against the shaft receiving the sleeve body, which results in an even better power transmission between the shaft and the sleeve body and thus also to the gear rim.

The sleeve body is preferably designed as a standardized component. To adapt the sleeve body to the drive shaft, the recess provided by the sleeve body for receiving the drive shaft must be drilled in accordance with the diameter of the drive shaft before mounting the sleeve body. Also the groove provided for receiving the feather key on the drive shaft side must be adapted to the dimensions of the feather key on the drive shaft side if necessary.

The advantage of this design is that a standard sleeve body equally suitable for all drive shafts can be used independently of the geometric design of the drive shaft. This reduces stock keeping, ensures compatibility and simplifies assembly. Accordingly, especially in the case of repair of a broken sprocket, replacement thereof is easily possible by drilling the standard sleeve and adapting the feather key prior to assembly and thereafter mounting the sleeve on the drive shaft. In a second assembly step, the gear rim must be arranged on the sleeve body, aligned in its axial position relative to the drive shaft as described above and, in final assembly step, secured in its position relative to the sleeve body. In this way it is possible to exchange a broken sprocket for a new sprocket in a simple manner and independently of the geometric design of the drive shaft.

According to a further feature of the disclosure it is provided that the two half-shells are screwed together in the final assembled state. Such a screw connection can be easily formed on site, especially in case of repair. It just has to be ensured that the respective thread provided by respective half-shell is not deformed by tilting of the two half-shells. Otherwise, it is not problematic when the two half shells are arranged at a distance from each other with a tolerance gap left there between.

According to a further feature of the disclosure it is provided that the gear rim is designed in two parts and comprises two corresponding gear rim halves that can each be constructed as one piece. These two halves of the gear rim allow the gear rim to be mounted without removing the drive shaft beforehand. The two halves of the gear rim can thus be placed on a sleeve body pre-assembled on the drive shaft and connected to each other, for example by screwing. As soon as the two halves of the gear rim are arranged on the sleeve body and connected to each other, the gear rim can be positioned in the axial direction to the drive shaft as described above by rotating the gear rim in relation to the sleeve body. After securing the position of the gear rim in relation to the sleeve body, this possibility of rotation is blocked, thus ensuring an arrangement of the gear rim formed from two halves in a manner secured against rotation in relation to the sleeve body.

According to a further feature of the disclosure it is provided that clamping brackets are provided for the connection of the two halves of the gear rim, which clamping brackets provide clamping webs engaging in corresponding recesses formed in the halves of the gear rim in the final assembled state.

The use of clamping brackets is preferred particularly in a case where the ring carrier is a pot-like design. In this case, the connecting region of the ring carrier that is operatively connected to the sleeve body is screwed. The connecting region of the ring carrier distant from the sleeve body is coupled by means of the clamping brackets, which clamping brackets have the advantage of enabling an assembly accessible from one side. It is thus possible to arrange the sprocket while leaving only a minimum clearance gap to an adjacent assembly and/or a boundary wall. The clamping bracket has clamping webs that engage in corresponding recesses of the sprocket. This ensures a positive and non-positive connection between the two halves of the gear rim. The clamping bracket is equipped with a screw that is disposed between the two clamping webs and is guided through a recess in the sprocket to the other side of the sprocket where a screw connection can be made. This ensures access to the clamping bracket for position fixing from one side.

According to a further feature of the disclosure, means are provided which serve the purpose of fixing the gear rim on the sleeve body in a non-rotating manner. These means are mounted after the already finally mounted gear rim has been finally rotated for positional adjustment in an axial direction of the drive shaft in relation to the sleeve body. As soon as these means are mounted, further rotation of the gear rim in relation to the sleeve body is no longer possible, whereby the sprocket is finally mounted.

According to a further feature of the disclosure it is provided that a means for a non-rotating arrangement of the gear rim on the sleeve body is a bolt. In the final assembled state, the bolt equally engages in corresponding grooves of the sleeve body and the gear rim. The grooves have a semicircular cross section so as to form a bore when the grooves overlap in a corresponding position of the gear rim and the sleeve body, and the bolt is to be inserted in this bore for position fixing. A plurality of such grooves can be distributed over the circumference of the sleeve body. In the case of two grooves, for example, the position can be fixed every 180° of the rotary position of the gear rim in relation to the sleeve body. In the case of three grooves, the position can be fixed every 120° of the rotary position.

The disclosure provides a sprocket that can be easily assembled and disassembled without removing the drive shaft on which the sprocket is to be mounted. It is also possible in a simple way to fine-align the gear ring carrying the toothing or the gear rim in the axial direction of the drive shaft. This allows a particularly space-saving arrangement of the sprocket next to adjacent components and/or building walls. The gear rim can be designed as a standardized component, which does not depend on the size of the drive shaft for arrangement on the drive shaft. This is because the gear rim is arranged on the drive shaft with the sleeve body interposed. This ensures compatibility in any case, because the gear rim is in operative connection with the sleeve body, which is preformed.

The sleeve body is also preferably of standardized design. For mounting on the drive shaft, the recess of the sleeve body receiving the drive shaft and the feather key groove must be adapted on site if necessary, especially in the event of repair. This is simply possible by drilling.

FIGURES

Figure 2:
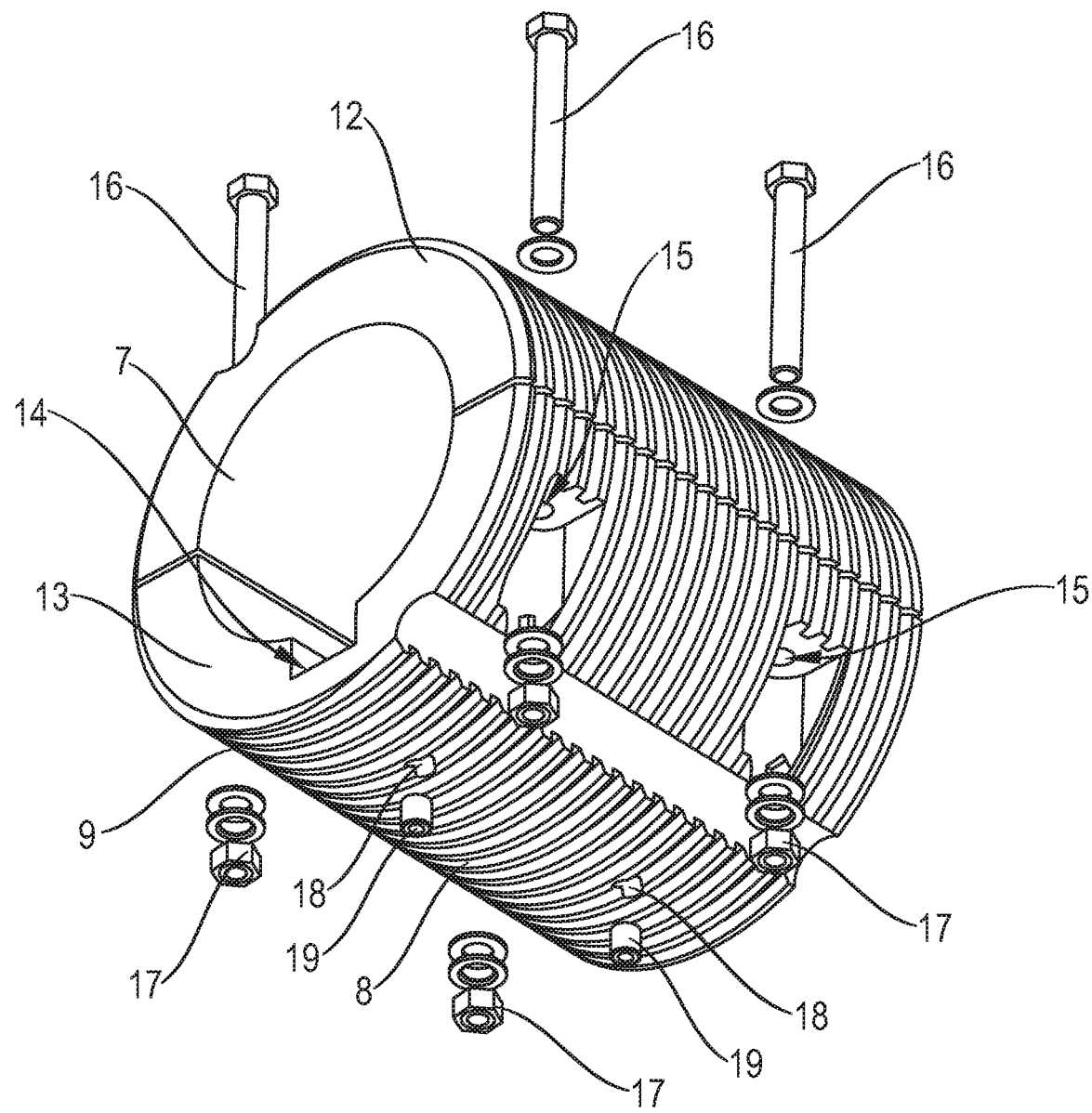

Further features and advantages of the disclosure will become apparent from the following description with reference to the attached drawings wherein it is shown by:

FIG. 1 a schematic perspective view of a sprocket according to the disclosure;

FIG. 2 a schematic perspective view of the sleeve body of a sprocket according to the disclosure.

Figure 3:
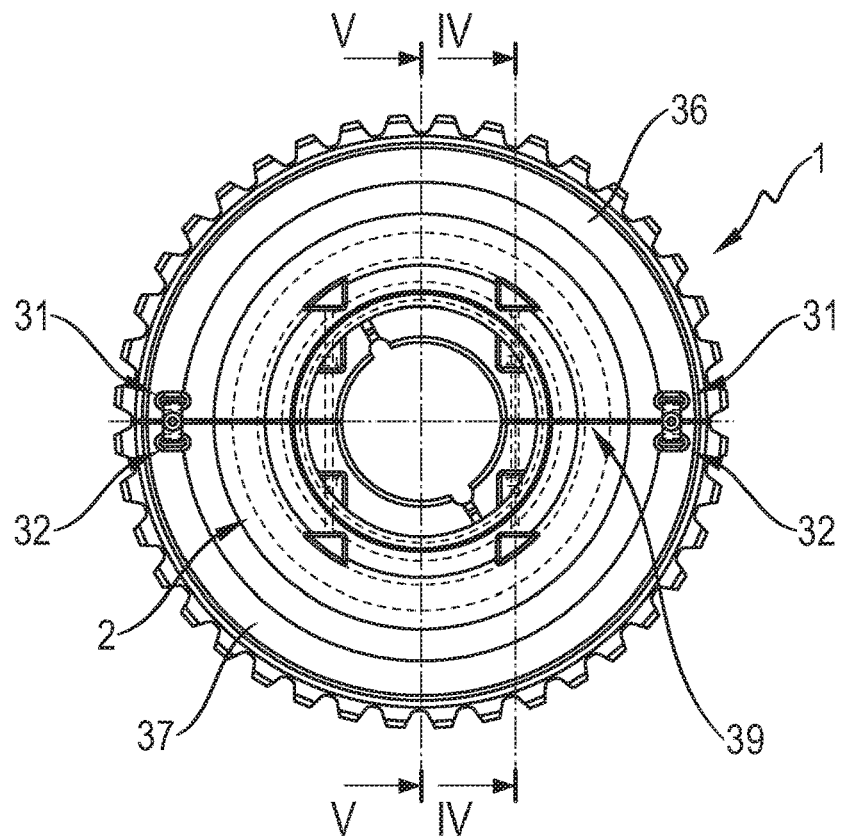
Figure 4:
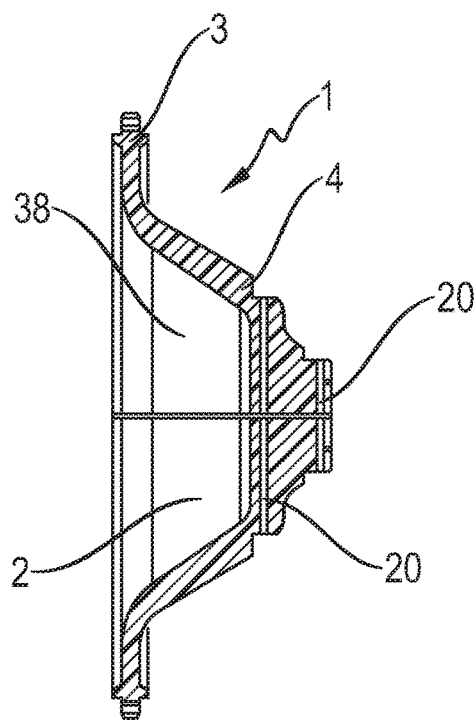
Figure 5:
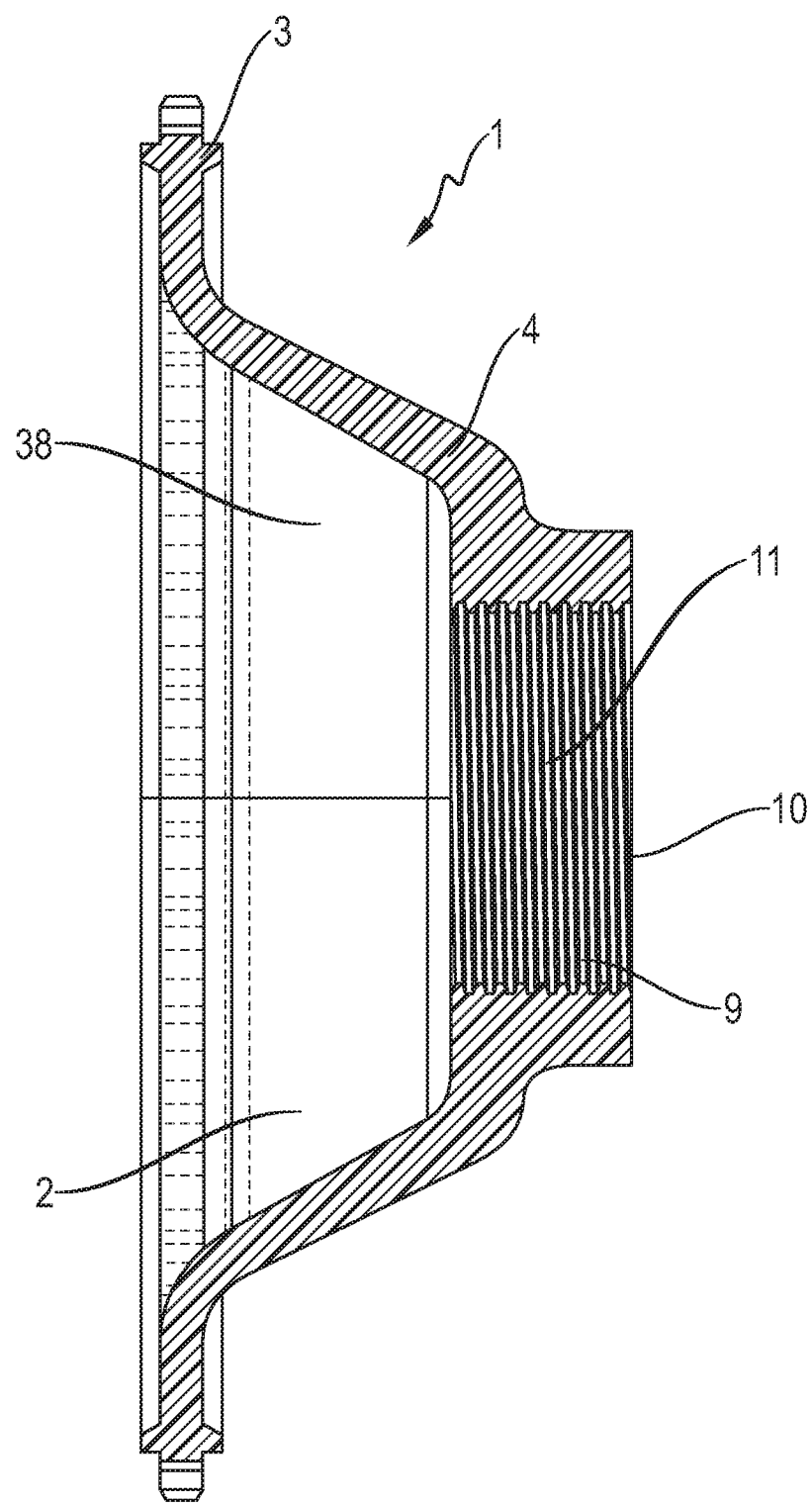
Figure 6:
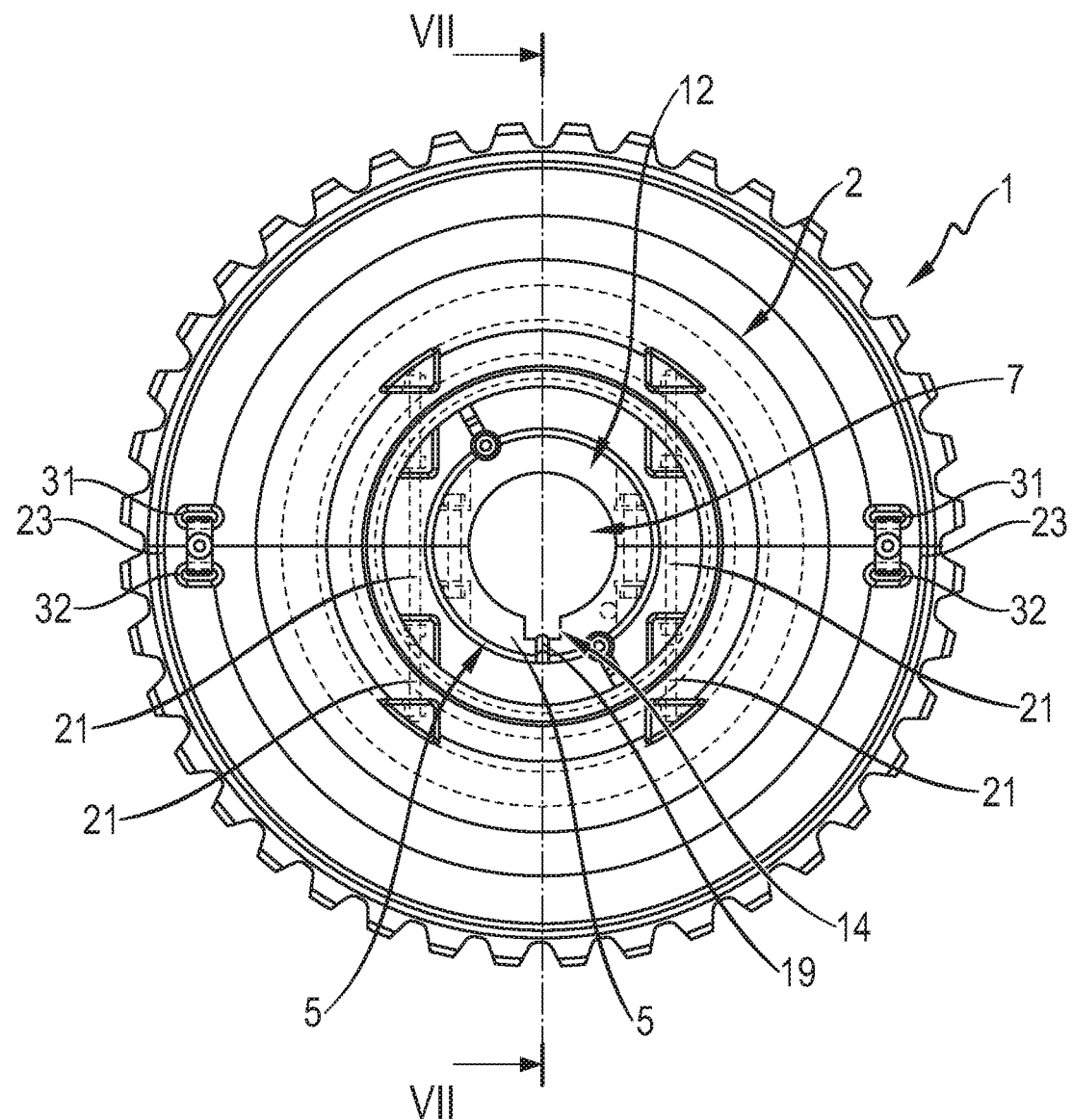
Figure 7:
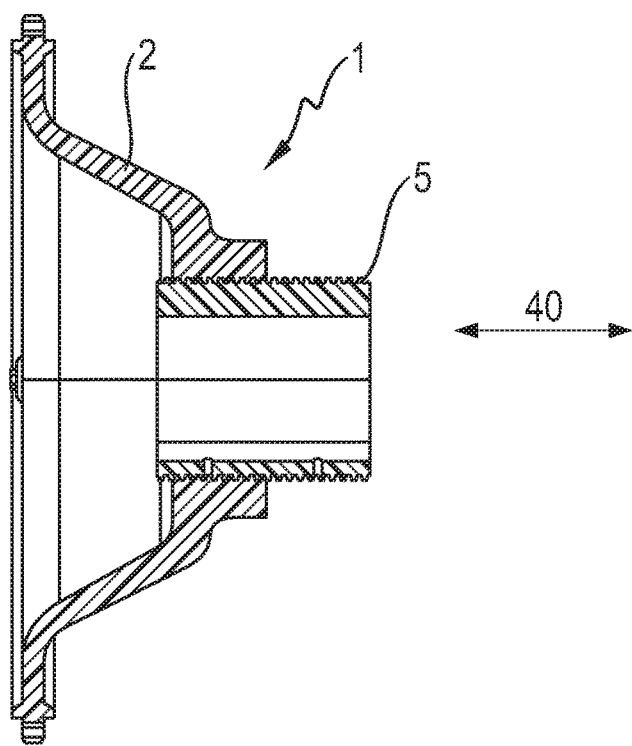
Figure 8:
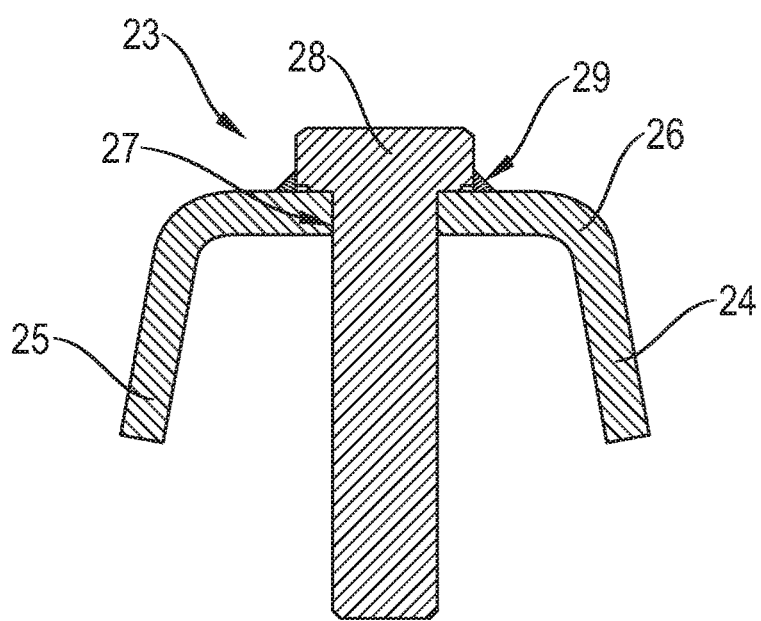
Figure 9:
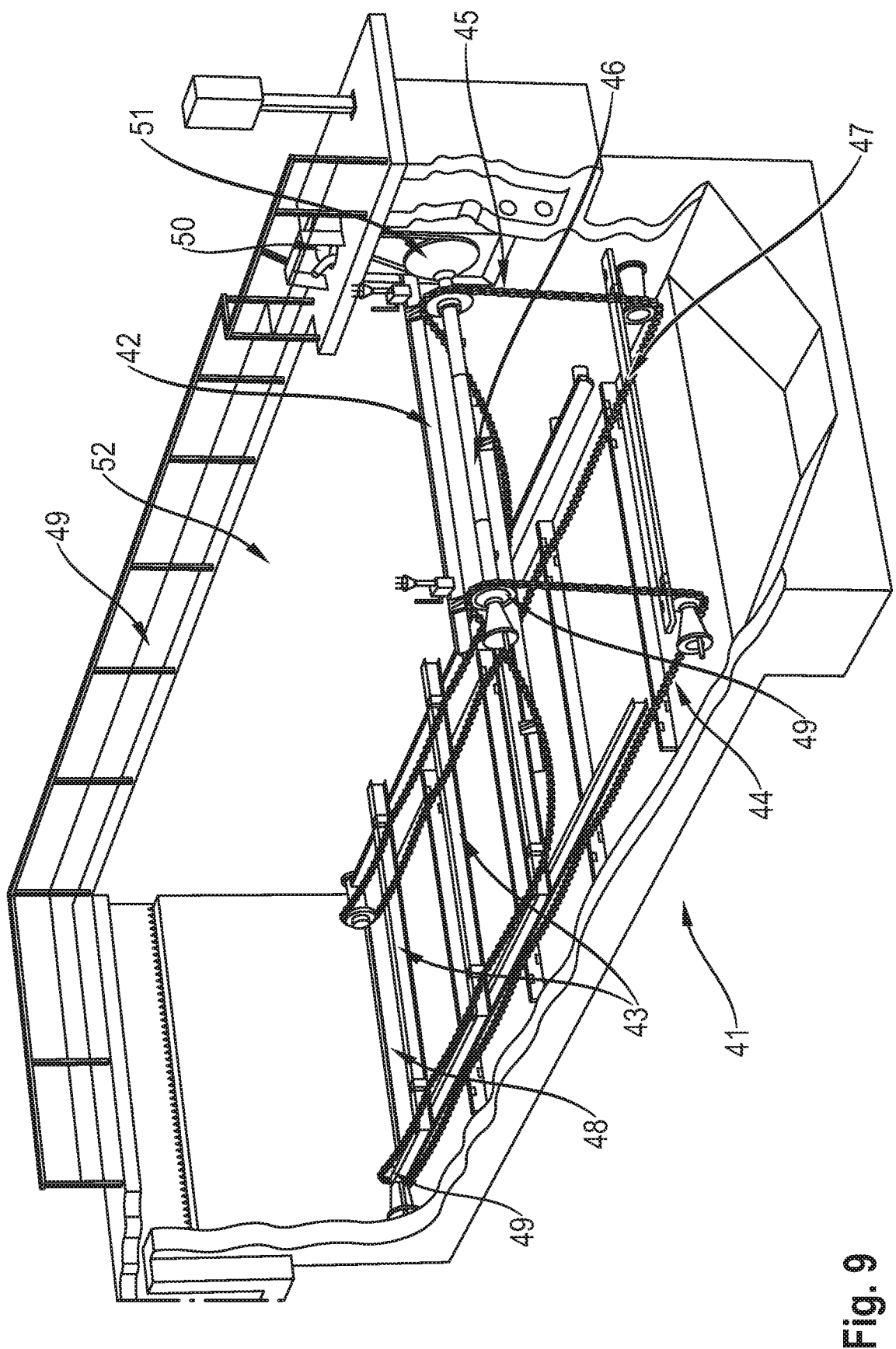

FIG. 3 a schematic perspective front view of the gear rim of a sprocket according to the disclosure;

FIG. 4 a partially cut side view of the gear rim according to FIG. 3, taken along line IV-IV;

FIG. 5 a sectional side view of the gear rim according to FIG. 3, taken along line V-V;

FIG. 6 a schematic front view of the sprocket according to the disclosure;

FIG. 7 a sectional side view of the sprocket according to the disclosure in accordance with FIG. 6, taken along line VII-VII;

FIG. 8 a schematic sectional view of a clamping bracket;

FIG. 9 a schematic perspective view of a clarifier with a scraper having the sprocket according to the disclosure.

DETAILED DESCRIPTION

FIG. 1 shows a schematic perspective view of a sprocket 1.

The sprocket 1 has a gear rim 2 and a sleeve body 5. The gear rim 2 in turn provides a gear ring 3 and a ring carrier 4. The gear rim 2 and the sleeve body 5 are preferably made of plastic.

For the arrangement of the chain sprocket 1 on a drive shaft, the sleeve body 5 has a recess 7 that serves to receive a drive shaft. The ring carrier 4 of the gear rim 2 in turn has a recess 6 for receiving the sleeve body 5. This means that the gear rim 2 is arranged on a drive shaft in the final assembled state of the sprocket 1 with the sleeve body 5 disposed in between.

The sleeve body 5 has an outer lateral surface 8 that is provided with a thread 9. A corresponding thread 11 is provided by the inner side 10 of the recess 6 of the ring carrier 4. In the final assembled state, these two threads 9 and 11 engage each other as shown in the drawings according to FIGS. 1 and 7.

After mounting the gear rim 2 on the sleeve body 5, the thread design allows the gear rim 2 to be positioned in relation to the sleeve body 5 in the axial direction, i.e. in the longitudinal direction 40 of the drive shaft (FIG. 7). This axial alignment of the gear rim 2 with respect to the sleeve body 5 is achieved by rotating the gear rim 2 in relation to the sleeve body 5. Due to the pitch of the meshing threads 9 and 10 of the gear rim 2 and the sleeve body 5, depending on the direction of rotation of the gear rim 2, there is an axial displacement of the gear rim 2 in relation to the sleeve body 5 with respect to the drawing plane according to FIG. 7 either to the left or to the right. This allows a fine adjustment of the axial position of the gear rim 2 in relation to the sleeve body 5 and thus also to the drive shaft.

As soon as the gear rim 2 is positioned in its axial orientation, the gear rim 2 is arranged in a non-rotating manner relative to the sleeve body 5. Bolts 35 are provided for this purpose (FIG. 1), which in the final assembled state engage in corresponding grooves 33 and 34 of the sleeve body 5 and the gear rim 2.

As FIG. 1 shows in this context, the grooves 33 and 34 are each designed as half-grooves. These must be brought into overlap with each other by a corresponding rotating movement of the gear rim 2, whereby in case of overlap a hole is provided for inserting the bolt 35. Clamping screws may be provided for the axial securing of mounted bolts 35, which in the final assembled state engage in the respective ring grooves that are provided. This ensures axial securing of the bolts 35. And the bolts 35 in turn ensure that any rotating movement of the gear rim 2 against the sleeve body 5 is blocked. This ensures axial and radial securing of the gear rim 2 relative to the sleeve body 5.

According to the embodiment shown in FIG. 1, two grooves 33 and 34 are provided rotated by 180° relative to each other. This allows the gear rim 2 to be rotated by 180° relative to the sleeve body 5 and secured in position. This gradation can be further reduced if three, four or even more grooves 33 or 34 are provided, so that the pitch ratio is reduced.

FIG. 5 shows an enlarged view of the sleeve body 5. This has a recess 7 as described above, through which the drive shaft, on which the chain sprocket 1 is mounted, is guided in the final assembled state. For a non-rotating arrangement of the sleeve body 5 relative to the drive shaft, a groove 14 is provided which is formed corresponding to a feather key on the drive shaft side.

For ease of assembly, the sleeve body 5 is designed in two parts and has two half-shells 12 and 13, which are screwed together in the final assembled state, for which purpose screws 16 and corresponding nuts 17 are provided which pass through bores 15 provided by the half-shells 12 and 13. For assembly, the sleeve body 5 must be dismantled and the half-shells 12 and 13 must then be placed on the drive shaft. A snug fit is achieved when the feather key on the drive shaft side is located in the groove 14 provided for this purpose. The two half-shells 12 and 13 must then be screwed together to ensure that the sleeve body 5 is securely seated on the drive shaft. For additional clamping with the feather key on the drive shaft side, clamping screws 19 can be provided, which penetrate through corresponding holes 18 of the sleeve body 5. These clamping screws 19 must be tightened after the sleeve body 5 is arranged on the drive shaft so that clamping with the feather key on the drive shaft side is achieved.

The sleeve body 5 is preferably of standardized design with regard to its recess 7 and its groove 14, with geometric dimensions being given with regard to the recess 7 and the groove 14 which correspond to the smallest possible geometric dimensions of a drive shaft. If the sleeve body 5 is to be mounted on a drive shaft with larger geometric dimensions, the bore 7 must first be drilled out and/or the groove 14 enlarged before the sleeve body 5 is mounted as intended. The sleeve body 5 can then be arranged on the drive shaft in the manner described above.

The standardized design of the sleeve body 5 has the advantage that a sleeve body 5 can always be designed to match the drive shaft, which makes assembly easier in the event of repairs. This is because it is neither necessary to provide a sleeve body suitable for the drive shaft nor is it necessary to carry out a preliminary measurement of the drive shaft in order to have a correspondingly designed sleeve body 5 available. Since the sleeve body 5 is matched to the smallest possible drive shaft in diameter, compatibility is guaranteed in every case. If the diameter of the drive shaft and/or its feather key is larger than the smallest possible design, the sleeve body 5 must be adapted accordingly, which can be done by simple drilling.

The sleeve body 5 is always identically designed concerning its outer dimensions and its thread 9 so that geometric compatibility with the gear rim 2 is given in any case, irrespective of the geometric design of the drive shaft.

Also the gear rim 2 is preferably of two-part design and comprises a first gear rim half 36 and a second gear rim half 37, as shown in particular in a combined view of FIG. 1 and FIG. 3. In the final assembled state, the two gear rim halves 36 and 37 lie against each other along a gap 39 (FIG. 3).

The two-part design of sleeve body 5 on the one hand and the gear rim 2 on the other hand is particularly advantageous for reasons of simplified assembly. This is because it is not necessary to dismantle the drive shaft in order to arrange the sprocket 1 on a drive shaft. Rather, the two-part design of sleeve body 5 and the gear rim 2 allows the sleeve body 5 on the one hand and the gear rim 2 on the other hand to be placed with their respective halves on the drive shaft and then the two halves to be joined to each other. In this process, the sleeve body 5 is first mounted on the drive shaft, followed by an arrangement of the gear rim 2 on the already pre-assembled sleeve body 5.

The gear rim halves 36 and 37 are preferably screwed together in the final assembled state. For this purpose, the gear rim halves 36 and 37 each have bores 20, as shown in FIGS. 3 and 4. In the final assembled state, threaded rods 21 are guided through these bores 20, said threaded rods 21 being equipped with a thread for receiving a nut 22 at their end.

FIGS. 6 and 7, in particular, show the final assembled condition of the gear rim 2 and the sleeve body 5.

As shown by a combined view of FIGS. 1 and 6, the gear rim halves 36 and 37 are screwed together by means of the threaded rods 21 close to the sleeve body. On the gear ring side, clamping brackets 23 are provided for connecting the two gear rim halves 36 and 37. Such a clamping bracket 23 is shown, for example, in FIG. 8.

A clamping bracket 23 has two clamping webs 24 and 25, which engage in corresponding recesses 31 and 32 of the gear rim halves 36 and 37 in the final assembled state. The two clamping webs 24 and 25 are connected to each other via a connecting web 26 that has a bore 27 through which a screw 28 is guided. The screw 28 is preferably connected to the connecting web in a material-to-material manner, for which purpose a weld seam 29 is formed in the embodiment shown in FIG. 8.

The screw 28 has a thread that cooperates with a nut 30 in the final assembled state, as shown in FIG. 1. The screw 28 is guided through a recess provided by the gear rim 2.

As shown in particular in FIG. 1, the special advantage of the clamping bracket 23 is that it is inserted into the recesses 31 and 32 from one side, while the position is fixed by attaching the nut 30 from the other side. This makes it possible, in particular, to dismantle the gear rim 2 from only one side. In addition, the clamping bracket 23 is very space-saving so that the gear rim 2 with its gear ring 3 can be placed close to an adjacent object or a housing wall without the clamping web 23 obstructing such a close arrangement.

In the example shown, the ring carrier 4 is designed as a pot. This results in a volume space 38 enclosed by the ring carrier 4, as can be seen in particular from the illustrations in FIGS. 4 and 5. This volume space 38 can be used to accommodate the bearing intended for supporting a drive shaft. The sprocket 21 thus encloses the bearing on the drive shaft side, which allows a close arrangement of the toothed ring 3 provided by the sprocket 1 next to an object on the gear ring side and/or next to a housing wall. Due to the design according to the disclosure, a simple assembly is possible because access to the sprocket 1 from one side is sufficient and because an arrangement of the sprocket is also possible on an already mounted drive shaft. In addition, due to the thread formed between the sleeve body 5 and the gear rim 2, fine positioning in the longitudinal direction 40 can take place so that it is sufficient in the sense of a simple assembly to first align the sleeve body 5 only roughly in relation to the drive shaft, since a fine alignment can be carried out thereafter by aligning the gear rim 2 in the longitudinal direction 40 in relation to the sleeve body 5 and thus also in relation to the drive shaft.

A possible use of the sprocket 1 according to the disclosure is shown in the execution example according to FIG. 9.

FIG. 9 schematically shows a clarifier 41 for clarifying water, for example. This clarifier 41 has a scraper 42 known per se from prior art.

When used as intended, the clarifier 41 is filled with water to be cleaned, which water is first allowed to stand so that impurities in the water can settle downwards. After a certain time, the scraper 42 is activated, which removes the impurities deposited downwards and takes them to a collection point from where the impurities can be removed.

The scraper 42 has a number of beams 43 aligned transversely in the clarifier 41. These beams 43 are arranged at one end and at the other end of a respective chain 44 or 45. These chains 44 and 45 are guided by deflection gears 49 such that the beams 43 are moved in the longitudinal direction of the chain during operation. The deflection gears 49 are arranged on respective shafts 46, 47 and 48.

For driving the chains 44 and 45, the shaft 46 is used, which is designed as a drive shaft. A motor 50 is provided for driving this shaft 46 and is operatively connected to the shaft 46 via a drive chain 51. During normal operation the shaft 46 is rotated by the motor 50 and the motor 50 is operatively connected to the shaft 46 via the drive chain 51.

A sprocket 1 according to the disclosure, which is mounted on the shaft 46, is used to transmit power from the motor 50 to the drive shaft 46.

Due to the inventive design of the sprocket 1 it is possible to place it close to the wall 52 of the clarifier 41, leaving only a minimal gap. The volume space 38 provided by the sprocket 1 accommodates the bearing of the shaft 46 provided on the inside of the wall 52. This ensures a space-optimized arrangement.

The sprocket 1 wears over time even when the clarifier 41 is used as intended and must therefore be replaced from time to time. The design according to the disclosure allows this in a simple way. For an exchange of the sprocket 1 it is not necessary to exchange the shaft 46 as described above. In addition, there is compatibility with the geometric design of the shaft 46 so that there is no need for storage and for prepared measures for an assembly or disassembly of the sprocket 1 as intended.

What is claimed is:

1. A sprocket for arrangement on a drive shaft, the sprocket having a gear rim which has an externally toothed gear ring and a ring carrier, and a sleeve body, wherein the ring carrier has a recess for receiving the sleeve body and the sleeve body has a recess for receiving the drive shaft so that the gear rim can be arranged on the drive shaft with the sleeve body interposed there between, wherein the sleeve body is formed in two parts and has two corresponding half-shells, wherein the two half-shells are screwed together in a final assembled state, wherein the sleeve body is provided with a thread on its outer lateral surface and wherein the recess of the ring carrier provided for receiving the sleeve body has on the inner side thereof facing the sleeve body a thread corresponding to the thread of the sleeve body, wherein the gear rim is rotatable about an axis of rotation of the drive shaft relative to the sleeve body and guided by the thread of the sleeve body and, depending on the direction of rotation, translatable along the axis of rotation of the drive shaft in relation to the drive shaft to adjust an axial position of the gear rim in relation to the drive shaft.

2. The sprocket according to claim 1, wherein the gear ring and the ring carrier are one piece.

3. The sprocket according to claim 1, wherein one of the half-shells has a longitudinal groove for receiving a feather key side.

4. The sprocket according to claim 1, wherein the gear rim is formed in two parts and has two corresponding gear rim halves.

5. The sprocket according to claim 4, wherein the two gear rim halves are screwed together in the final assembled state.

6. The sprocket according to claim 4, wherein clamping brackets are provided for connecting the two sprocket halves, which clamping brackets provide clamping webs which engage in correspondingly formed recesses of the sprocket halves in the final assembled state.

7. The sprocket according to claim 1, further comprising means for a non-rotating arrangement of the gear rim on the sleeve body.

8. The sprocket according to claim 7, wherein the means for a non-rotating arrangement is a bolt which equally engages in corresponding grooves of the sleeve body and the gear rim in the final assembled state.

\* \* \* \* \*